United States Patent [19]

Furukawa

[11] Patent Number: 5,466,544
[45] Date of Patent: Nov. 14, 1995

[54] METHOD FOR MANUFACTURING A HYDROGEN-OCCLUSION-ALLOY ELECTRODE

[75] Inventor: Jun Furukawa, Iwaki, Japan

[73] Assignee: Furukawa Denchi Kabushiki Kaisha, Tokyo, Japan

[21] Appl. No.: 217,943

[22] Filed: Mar. 25, 1994

[30] Foreign Application Priority Data

Mar. 30, 1993 [JP] Japan ..................... 5-071419

[51] Int. Cl.⁶ ..................................... H01M 4/04
[52] U.S. Cl. .................. 429/59; 429/101; 420/900; 427/420; 427/427; 29/623.5
[58] Field of Search ................ 429/57, 59, 101; 420/900; 427/420, 427; 29/623.5

[56] References Cited

U.S. PATENT DOCUMENTS 4,636,445  1/1987  Yamano et al. .
4,719,127  1/1988  Greenberg .................... 427/165
4,837,119  6/1989  Ikoma ......................... 429/206

*Primary Examiner*—Stephen Kalafut
*Assistant Examiner*—M. Nuzzolillo
*Attorney, Agent, or Firm*—Frishauf, Holtz, Goodman, Langer & Chick

[57] ABSTRACT

A method for manufacturing a hydrogen-occlusion-alloy electrode is provided, wherein a hydrogen-occlusion-alloy ingot is mechanically crushed, the obtained powder is washed in water to remove dust-size particles from the surface thereof, the washed powder is used in a moisten state after said washing as it is to prepare a slurry of a specified composition, and the slurry is supported on to a current collector. Incorporating this hydrogen-occlusion-alloy electrode in a nickel-hydrogen storage battery as the negative electrode leads to reduced internal pressure of the battery, an extended charge and discharge cycle life, and an improved rapid discharge characteristic.

8 Claims, 1 Drawing Sheet

METHOD FOR MANUFACTURING A HYDROGEN-OCCLUSION-ALLOY ELECTRODE

BACKGROUND OF THE INVENTION

1. Field of the Invention

The present invention relates to a method for manufacturing a hydrogen-occlusion-alloy electrode and more particularly to a method for manufacturing a nickel-hydrogen storage battery using the electrode as a negative electrode thereof to achieve reduced pressure inside the battery at the time of charging, a longer cycle life, and improved rapid discharging characteristic.

2. Prior Art

As the variety of electric and electronic equipment grows smaller in size, lighter in weight and are made cordless, the batteries used for their power supplies must be made increasingly smaller and lighter but with higher capacity.

A nickel-hydrogen storage battery is recently attracting attention as a high-capacity battery which responds to such demand.

The nickel-hydrogen storage battery operates using hydrogen as a negative electrode active material thereof; it comprises a negative electrode comprising a hydrogen-occlusion-alloy, which permits reversible occlusion and release of hydrogen and which is supported on a current collector, and a positive electrode comprising a nickel hydroxide, which normally functions as a positive electrode active material, the nickel hydroxide being supported on the current collector, and the negative and positive electrodes being disposed in an alkali electrolyte via a liquid retentive separator.

The hydrogen-occlusion-alloy electrode used for the battery is generally manufactured as set forth below.

First, a hydrogen-occlusion-alloy having a specified composition is prepared using an arc melting furnace, for example. An ingot thus obtained is mechanically crushed into powder of a desired particle size by using a crusher such as a ball mill and a hammer mill.

Then, the powder is directly mixed with a binding agent such as polytetrafluoroethylene or vinylidene fluoride and the mixture is molded into a sheet, thus producing the hydrogen-occlusion-alloy electrode.

There is another method for manufacturing the hydrogen-occlusion-alloy electrode. Unlike the method described above, in this method, a slurry is prepared by dispersing the aforesaid alloy powder in a solution which consists of a thickener such as methyl cellulose, carboxymethyl cellulose, and ethylene oxide dissolved in ion-exchange water or distilled water. Then a current collector such as a perforated nickel sheet is immersed in the slurry then drawn up so that the slurry is attached to the surface of the current collector. Next, the attached slurry is dried and the whole sheet with the dried slurry is rolled to provide the surface of the current collector with a hydrogen-occlusion-alloy powder layer of a desired thickness, thus producing the hydrogen-occlusion-alloy electrode.

In the nickel-hydrogen storage battery, a potential level at which charging reaction of the hydrogen-occlusion-alloy takes place is a value which is close to an electrolytic potential of the water constituting the alkali electrolyte. For this reason, during a charging process, water electrolysis may partly lead to generation of hydrogen. Hence, at the end of the charging process, the pressure inside the battery rises because the gas pressure of the hydrogen gas, which has been generated from the water electrolysis, is added. Such a rise in the internal pressure can be controlled to a certain extent by increasing the capacity of the negative electrode. This, however, results in an increased size of the battery, and therefore, it is not desirable in the light of the demand for compact batteries with a higher energy density.

Like other storage batteries such as a nickel-cadmium storage battery, the capacity of the nickel-hydrogen storage battery gradually decreases as charging and discharging is repeated until the life of the battery finally expires.

In the case of the nickel-cadmium storage battery, the life of the battery is determined to have expired when the capacity thereof has reached 60% or less of the rating. The battery is required to be capable of repeating at least 500 charge and discharge cycles before the life thereof expires.

In the case of the nickel-hydrogen storage battery, which is conventionally known, the number of charge and discharge cycles before the capacity of the battery drops to approximately 80% of the rating thereof ranges from 300 to 350 and the number of the charge and discharge cycles before the capacity reduces to approximately 60% of the rating ranges from 350 to 400. In other words, the capacity of the battery reduces to approximately 80% and 60%, respectively, when the charge and discharge cycle is repeated for the numbers of times mentioned above. It further means that the service life of the nickel-hydrogen storage battery expires after 300 to 400 charge and discharge cycles.

Hence, there is demand for developing a nickel-hydrogen storage battery which has a longer service life.

OBJECTS AND SUMMARY OF THE INVENTION

An object of the present invention is to provide a method for manufacturing a hydrogen-occlusion-alloy electrode which enables a nickel-hydrogen storage battery using the electrode as a negative electrode thereof to reduce internal pressure at the time of charging, extend the charge and discharge cycle life, and exhibit good rapid discharging characteristic.

To fulfill the object described above, according to the present invention, a method for manufacturing a hydrogen-occlusion-alloy electrode is provided, the method comprising a step wherein an ingot of a hydrogen-occlusion-alloy is mechanically crushed, a step wherein the obtained powder is washed in water to remove dust-size particles from the surface thereof, a step wherein a slurry of a specified composition is prepared by using the aforesaid powder after removing the dust-size particles, and a step wherein the slurry is supported on a current collector.

DETAILED DESCRIPTION OF THE INVENTION

The inventor observed under a microscope the surface condition of the hydrogen-occlusion-alloy in a moisten state after it was crushed according to a conventional electrode manufacturing method. As a result, the inventor found the fact that a large quantity of dust-size particles, which were smaller than alloy powder 1, were on the surface of the alloy powder 1 as shown in the schematic diagram of FIG. 1. The diameters of the dust-size particles were approximately 10 μm or less although they vary depending on crushing conditions.

These dust-size particles were collected and composition thereof was analyzed. The analysis result revealed that the composition is significantly different from a target alloy composition and the particles contain oxides of ingredients making up the alloy.

For instance, when an ingot, which was produced in an arc melting furnace and which was composed of $MmNi_{3.3}Co_{1.0}Mn_{0.4}Al_{0.3}$ (Mm: misch metal), was crushed in a ball mill into alloy powder of 150 mesh (Tyler sieve), the dust-size particles attaching to the surface of the obtained alloy powder had Mm-rich contents including $Mm_2(Ni, Co, Mn, Al)_7$ and $Mm_1(Ni, Co, Mn, Al)_1$. It was also found that 0.5 to 2 wt % mainly of NiO, CoO, MnO, $Al_2O_3$, and $Mm_2O_3$ was contained in total.

Hence, the inventor found that using the alloy powder as it is immediately after mechanically crushing it prevents the hydrogen-occlusion-alloy from exhibiting intrinsic performance thereof since the alloy powder is covered with the dust-size particles as described above and also found that the oxides in the dust-size particles dissolve in an alkali electrolyte to form hydroxides.

Accordingly, the inventor obtained an idea that removing the aforesaid dust-size particles from the surface of the crushed hydrogen-occlusion-alloy restores the intrinsic performance of the hydrogen-occlusion-alloy, thus making it possible to fulfill the object discussed above. Thus, the inventor have developed the method of the present invention.

Figure 1:
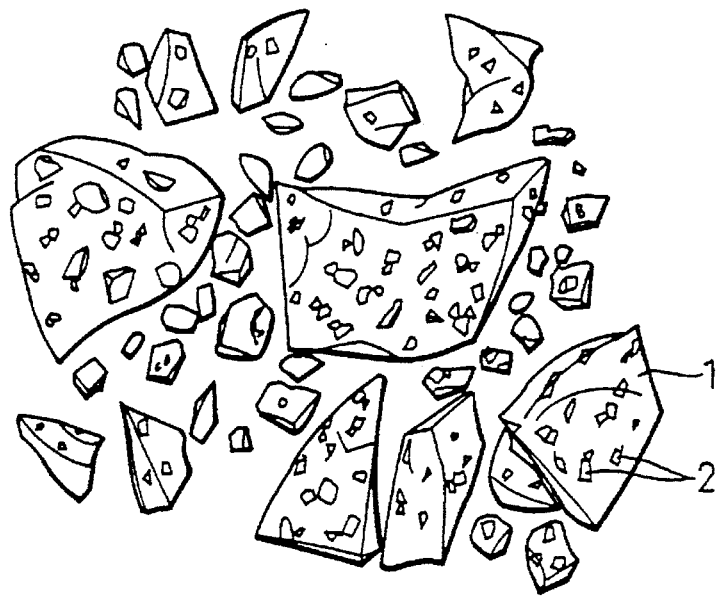
FIG. 1 is a schematic diagram which illustrates a surface condition of the alloy powder immediately after the hydrogen-occlusion-alloy ingot was mechanically crushed.

In the present invention, first, the hydrogen-occlusion-alloy ingot of the specified composition is mechanically crushed into alloy powder of a desired particle size by using a crusher such as a ball mill or a hammer mill. The obtained alloy powder carries a great quantity of dust-size particles attaching to the surface thereof as shown in FIG. 1.

Next, the aforesaid alloy powder is dispersed in wash water such as ion exchange water or distilled water and the whole wash water is stirred to clean the powder surface with the water. As a result, the dust-size particles on the powder surface are removed from the surface and they float in supernatant or on the surface of the wash water. At this time, adding an appropriate amount of a surfactant such as neutral detergent, nonionic-base, cationic-base or anionic-base, to the wash water effectively enhances the removal of the dust-size particles.

Then, the whole wash water is let stand for a desired time so that the alloy powder sediments, and the suspended matters in the supernatant or on the water surface are removed, then a slurry is immediately prepared without drying the alloy powder by heating. In this case, the alloy powder is filtered out and the wet alloy powder, which has just been filtered out, is put in a solution for slurry to prepare the slurry. Alternatively, both the supernatant, from which the suspended matters have been removed, and the alloy powder sediment are put in a thickener aqueous solution to directly prepare a slurry.

If the alloy powder should be dried by heating, the surface of the alloy powder is oxidized and the oxide dissolves in the alkali electrolyte to produce hydroxide which covers an active surface of the hydrogen-occlusion-alloy while assembling the battery. This leads to a rise in the internal pressure at the time of charging.

Next, without drying by heating, the filtered-out alloy powder was directly put in a solution, which consists of 200 grams of ion exchange water with 2 grams of carboxymethyl cellulose dissolved in it, to prepare the slurry.

A perforated nickel sheet, which was 0.07 mm thick and which had a 38% perforation rate (hole diameter: 1.5 mm), was immersed in the slurry and pulled out, then dried in the air before it was rolled under a 2 ton/cm² pressure to make a negative electrode sheet which was 0.4 mm thick.

Also, a spongy nickel sheet, which was 1.6 mm thick and which had a 96% porosity, was filled with an active material flux which was prepared by adding a carboxymethyl cellulose aqueous solution of a 1.2% concentration to a mixed powder consisting of 93 wt % of Ni (OH)₂ powder, 3 wt % of Ni powder, and 4 wt % of CoO powder, then the sheet was dried at 80° C. for 2 hours before it was rolled under a 2 ton/cm² pressure, thus making a positive electrode sheet. The filling quantity of the active material flux was 4.4 grams.

A nylon separator was disposed between the positive electrode sheet and the negative electrode sheet and the entire assembly was wound like a vortex to provide a power generating element having a 13 mm diameter. The element was housed in a cylindrical container which was made of steel plated with nickel and which had a 13.2 mm inside diameter. A KOH aqueous solution having a 1.38 specific gravity was poured in the container and the container was covered with a lid. Thus, three different types of tightly perforated nickel sheet, for example, is immersed in the slurry thus prepared and then pulled out so that the slurry attaches to the surface of the current collector. The current collector is dried in the air and rolled under a pressure of 0.5 to 10 ton/cm², preferably 2 to 4 ton/cm², thus producing the hydrogen-occlusion-alloy electrode according to the present invention.

EMBODIMENT

Using an arc melting method, a hydrogen-occlusion-alloy, the composition thereof is represented by $MmNi_{3.3} Co_{1.0} Mn_{0.4} Al_{0.3}$ (Mm denotes misch metal), was produced and the ingot thereof was crushed by a ball mill into powder of 150 mesh (Tyler sieve).

The surface condition of the obtained alloy powder was observed under a microscope (×200). As shown in FIG. 1, a great quantity of dust-size particles were on the surface of the alloy powder.

Then 1,000 grams of the alloy powder was put in 2 liters of ion exchange water and the water with the alloy powder in it was stirred for about 3 minutes and let stand for half a minute.

Figure 2:
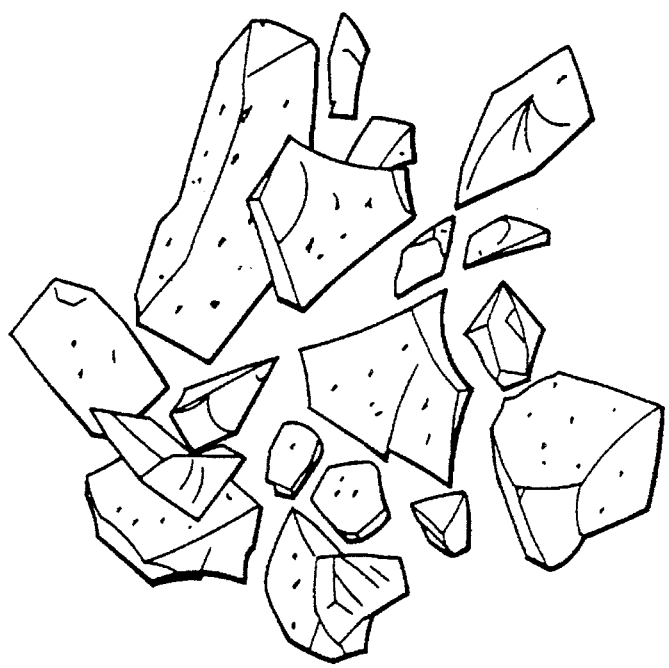
FIG. 2 is a schematic diagram which illustrates a surface condition of the alloy powder which has been washed in water.

The alloy powder, which sedimented, was filtered out and the surface condition of a part thereof was observed under the microscope (×200). The result is shown as a schematic diagram in FIG. 2. As it is obvious from FIG. 2, the dust-size particles were almost completely removed from the surface of the alloy powder.

Each of these batteries was charged under the condition indicated below and the internal pressure thereof was measured:

Charge: 1C, 4.5 hours; Temperature: 20° C.

In addition, a charge and discharge cycle test was conducted according to the specification shown below and the number of cycles at which the capacity of each battery reduced to 80% and 60%, respectively, of the rating thereof was counted. Charge: 1C, −ΔV control; Temperature: 20° C.

(The −ΔV control refers to a method wherein charging is started at the moment the voltage has dropped by a specified value after reaching a charging voltage peak.) Discharge: 1C, discharge end voltage: 1.0 V, Temperature: 20° C.

Further, a rapid discharge test at 20° C. was conducted. In the test, the batteries were charged at 20° C. and 0.2C for 7.5 hours, then discharged at 20° C. and 3C until 1.0 V was reached, and the 3C/0.2C discharge capacity ratios were measured. All the results are shown in Table 1 below.

For the purpose of comparison, another hydrogen-occlusion-alloy electrode was made under the same condition as that for the embodiment by using crushed alloy powder but without washing it in water. This was offered as comparison specimen 1 and it was used to make a battery which shared the identical structure. The battery was subjected to the measurement on the battery internal pressure, the charge and discharge cycle life, and the rapid discharge characteristic under the same condition as that for the embodiment. The results thereof are shown in Table 1.

Furthermore, alloy powder, which was filtered out after it was washed in water, was dried by heating in the air at a temperature of 80° C. for 2 hours, and the obtained alloy powder was used to make a hydrogen-occlusion-alloy electrode as comparison specimen 2. This electrode was incorporated in a battery which was also subjected to the measurement on the battery internal pressure, the charge and discharge cycle life, and the rapid discharge characteristic under the same condition as that of the embodiment. The results are also shown in Table 1.

TABLE 1

|  | Battery Internal Pressure (kg/cm$^2$) | No. of Cycles | | Discharge Capacity Ratio (%) |
|---|---|---|---|---|
|  |  | 80% of Rating | 60% of Rating |  |
| Embodiment | 18 | 450 | 600 | 83 |
| Com. specimen 1 | 25 | 350 | 400 | 78 |
| Com. specimen 2 | 23 | 400 | 450 | 81 |

What is claimed is:

1. A method for manufacturing a hydrogen-occlusion-alloy electrode, comprising the steps of:

mechanically crushing an ingot of a hydrogen-occlusion-alloy to form an alloy powder;

washing the alloy powder with water to remove dust-sized particles having a diameter of approximately 10 μm or less from the alloy powder and separating a wet alloy powder from the wash water; thereafter preparing a slurry of said wet alloy powder by mixing the wet alloy powder in water; and supporting the slurry on a current collector.

2. The method of claim 1 wherein the washing in water comprises the steps of mixing the alloy powder in water, stirring the mixture; and then allowing the alloy powder to sediment.

3. The method of claim 2 wherein distilled water or ion-exchanged water is used for preparing the slurry.

4. The method of claim 3 wherein distilled water or ion-exchanged water is used for the washing step.

5. The method of claim 1 wherein a surfactant is added to the water before washing the alloy powder.

6. The method of claim 4 wherein a surfactant is added to the water before washing the alloy powder.

7. The method of claim 1 wherein the current collector is a perforated nickel or nickel plated sheet.

8. The method of claim 7 wherein the step of supporting the slurry on the current collector comprises immersing the perforated nickel sheet or the perforated nickel plated current collect sheet in the slurry, then drawing the sheet up so that the slurry is attached to the perforated nickel sheet or the perforated nickel plated sheet, drying the coated sheet in air, and rolled the dried coated sheet under a pressure of 0.5 to 10 ton/cm$^2$.

* * * * *